United States Patent
Tyfour et al.

(10) Patent No.: US 10,241,009 B2
(45) Date of Patent: Mar. 26, 2019

(54) DEVICE FOR MEASURING AND COMPARING TIRE TO PAVEMENT SKID RESISTANCE

(71) Applicant: Jordan University of Science and Technology, Irbid (JO)

(72) Inventors: Wail Radwan Tyfour, Irbid (JO); Sarah Younes El-Qudah, Irbid (JO); Asal Khalil Al Shaikh Khalil, Irbid (JO)

(73) Assignee: JORDAN UNIVERSITY OF SCIENCE AND TECHNOLOGY, Irbid (JO)

( * ) Notice: Subject to any disclaimer, the term of this patent is extended or adjusted under 35 U.S.C. 154(b) by 180 days.

(21) Appl. No.: 15/098,811

(22) Filed: Apr. 14, 2016

(65) Prior Publication Data

US 2017/0299498 A1 Oct. 19, 2017

(51) Int. Cl.
*G01N 19/02* (2006.01)
*G01M 17/02* (2006.01)

(52) U.S. Cl.
CPC .................. *G01M 17/02* (2013.01)

(58) Field of Classification Search
CPC .............. G01N 19/02; G01N 17/02
See application file for complete search history.

(56) References Cited

U.S. PATENT DOCUMENTS

2011/0303018 A1* 12/2011 de Bondt ............ G01N 3/56
73/760

OTHER PUBLICATIONS

Brown's Concrete Products, LTD, Slip and Skid Resistance of Interlocking Concrete Pavements, Interlocking Concrete Pavement Institute, 1998, Revised Mar. 2008, ICPI Tech Spec No. 13, 8 pages.
Harish, H., Field Evaluation of Longitudinal Skid Resistance on Pavement Surface in Bangalore City—A Case Study, The International Journal of Engineering and Science, vol. 2, issue 6, May 30, 2013, pp. 10-18.
Tyfour, W.R., Tire Skid Resistance on Contaminated Wet Pavements, Jordan Journal of Mechanical and Industrial Engineering, vol. 3, No. 2, Jan. 2009, pp. 119-124.
Saplioglu, M., Investigation of the Skid Resistance at Accident Occurred at Urban Intersections, Journal of Traffic and Transportation Engineering, vol. 1, No. 1 (serial No. 1), Dec. 2013, pp. 19-29.

* cited by examiner

*Primary Examiner* — Xin Y Zhong
(74) *Attorney, Agent, or Firm* — Matheson Keys & Kordzik PLLC; Kelly Kordzik

(57) ABSTRACT

A manually operated portable device for comparing tire to pavement skid resistance under different tire to road contact conditions, wherein such device can be used at any location on any pavement type without the need for initial settings. The device can test various parameters, including the effect of tire material on skid resistance, the effect of pavement material, the effect of pavement surface roughness, and the effect of pavement surface conditions, as well as the coefficient of friction. The device may include a plurality of rotating arms, a plurality of shoe assemblies, a central shaft, a stabilizing weight, a square-sectioned shaft, a spring, a handle, and an angular scale.

20 Claims, 4 Drawing Sheets

DEVICE FOR MEASURING AND COMPARING TIRE TO PAVEMENT SKID RESISTANCE

TECHNICAL FIELD

The field of the present invention relates to a device for comparing and measuring tire to pavement skid resistance, and more particularly to a device that is portable, manually operated, and compares and measures tire to pavement skid resistance under different conditions.

BACKGROUND INFORMATION

Numerous conventional solutions found in the art have disclosed different devices and apparatuses for measuring skid resistance between a vehicle tire and the pavement.

Among these conventional solutions, there is provided a pendulum tester, which is a pendulum-based apparatus for measuring the skid resistance between pavement and tire. In this apparatus, the pendulum is released from the horizontal position by a quick release button, it swings down with uniform force each time, and the rubber slider at the bottom of the pendulum contacts the road surface for a fixed length previously set by increasing or decreasing the height of the pivot of the pendulum. The degree to which the pendulum will rise up the calibration on the left-hand side is dependent on the friction/resistance the rubber slider meets on the road surface.

Another conventional solution discloses an automatic measuring device for measuring the skid resistance of road, particularly to a measuring device for transverse force friction coefficient of road, and is used for measuring the transverse force friction coefficient of the highway road. Such device comprises a measuring rack, a lifting mechanism, a rail, a counterweight, a measuring wheel, and a sensor, wherein the lifting mechanism and a rail are provided on the measuring rack, the measuring wheel is provided on the counterweight, the counterweight is matched with the rail, and the sensor is provided on the measuring wheel.

In another conventional solution, there is provided a mechanical skid resistance tester for a building ground, which mainly comprises a base, a support, a friction slider, a graduated sleeve, and a spring, wherein the support is fixedly mounted on the base, a guide track is arranged on the support, the sleeve is arranged inside the guide track, the sleeve is in a sliding fit with the guide track, the spring is arranged inside the sleeve, one end of the spring is fixedly connected with the sleeve, and the other end of the spring is connected with the friction slider through a connecting rod. In the utility model, the sleeve is allowed to move so that the spring is stretched until the friction slider slides, and then a friction coefficient is calculated according to a displacement value.

None of the conventional solutions has disclosed a portable device for comparing and measuring tire to pavement skid resistance under different tire-road contact conditions without the need for initial settings.

SUMMARY

Aspects of the present disclosure have a portable manually operated device for measuring and comparing tire to pavement skid resistance under different tire-road contact conditions without any need for initial settings, instrumentation, or external power.

Aspects of the present disclosure have a device for measuring and comparing tire to pavement skid resistance, which can test an effect of tire material on skid resistance.

Aspects of the present disclosure have a device for measuring and comparing tire to pavement skid resistance, which can test an effect of pavement material.

Aspects of the present disclosure have a device for measuring and comparing tire to pavement skid resistance, which can test an effect of pavement surface roughness.

Aspects of the present disclosure have a device for measuring and comparing tire to pavement skid resistance, which can test an effect of pavement conditions, including wet, lubricated, and/or contaminated with any solid or liquid contaminants.

A tire to pavement skid resistance measuring and comparator device, according to aspects of the present disclosure, comprises one or more rotating arms, one or more shoe assemblies, a central shaft, a stabilizing weight, a square-sectioned shaft, a spring, a handle, and an angular scale.

The plurality of rotating arms may be identical, and substantially equally spaced from each other.

The plurality of rotating arms, may meet at a central axis, and rotate about such central axis.

Each shoe assembly may be fixed on one end of a rotating arm, wherein the distance is set to maximum between each assembly and the central axis.

The stabilizing weight may be a disc-shaped weight.

The center of the stabilizing weight may have a central shaft extending perpendicularly to the surface area of the stabilizing weight.

The square-sectioned shaft may be connected from one of its ends to the central shaft.

The handle may be connected to the other end of the square-sectioned shaft.

The spring may connect between the square-sectioned shaft and one of the rotating arms.

The angular scale may be connected to two adjacent rotating arms.

BRIEF DESCRIPTION OF THE DRAWINGS

Aspects of the present invention will now be described with reference to the accompanying drawings, which illustrate embodiments of the present invention, without restricting the scope of the invention, and in which.

DETAILED DESCRIPTION

Figure 1:
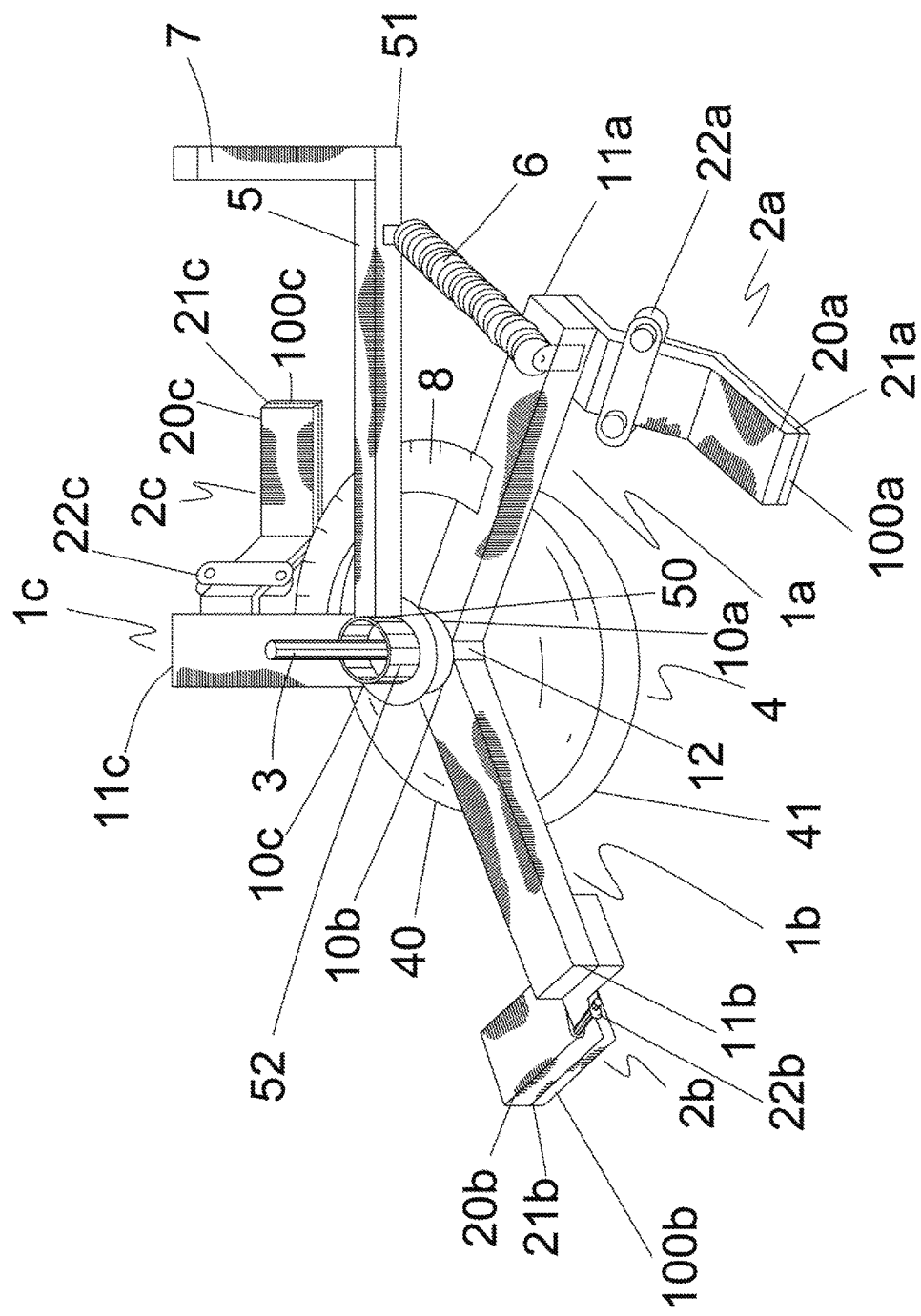
FIG. 1 illustrates a perspective view of a portable device for measuring and comparing tire to pavement skid resistance under different conditions, configured according to embodiments of the present invention.
Figure 2:
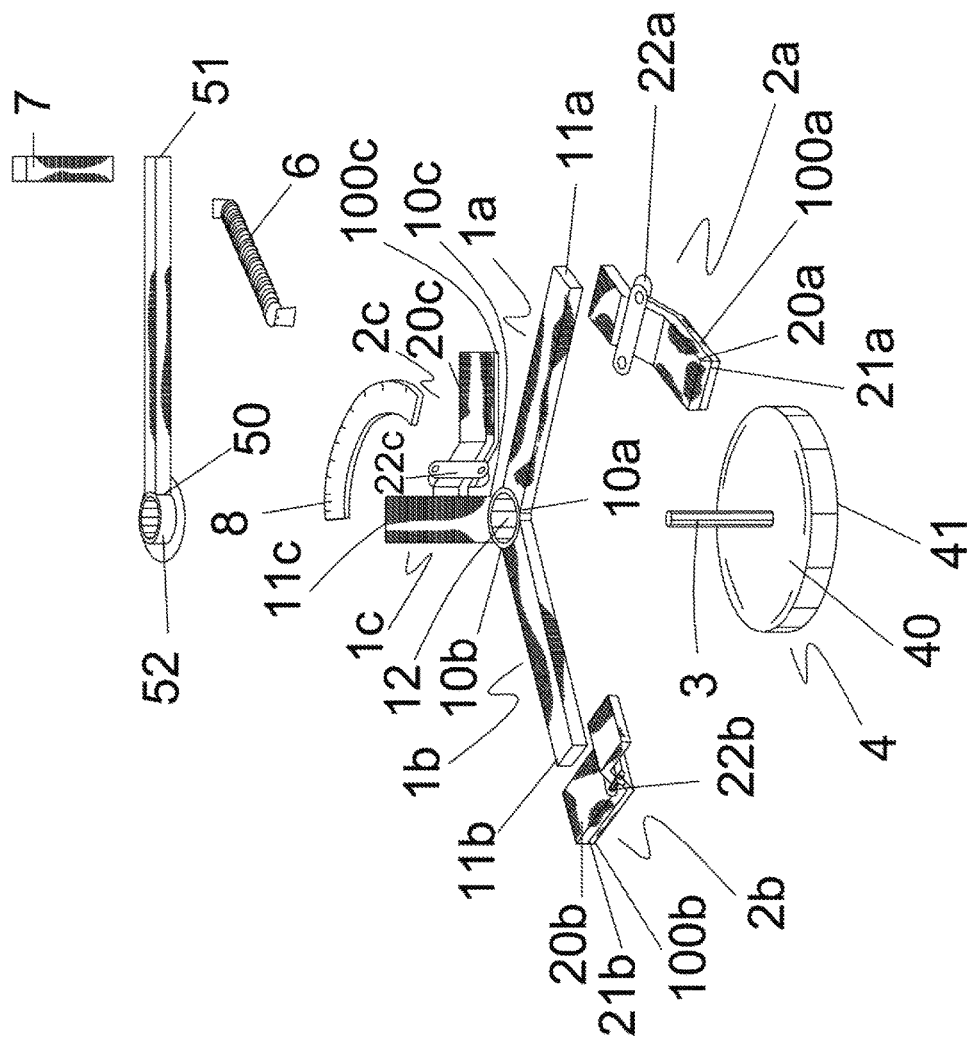
FIG. 2 illustrates an exploded view of a portable device for measuring and comparing tire to pavement skid resistance under different conditions, configured according to embodiments of the present invention.

FIGS. 1 and 2 illustrate a device for measuring and comparing tire to pavement skid resistance under different conditions configured according to embodiments of the present invention, wherein such embodiments comprise one or more rotating arms 1a, 1b, and/or 1c; one or more shoe assemblies 2a, 2b, and/or 2c; a central shaft 3; a stabilizing weight 4; a shaft 5 (which may be square-sectioned); a spring 6; a handle 7; and an angular scale 8. The device may be portable and/or manually operable. For purposes of hereinafter describing embodiments of the present invention, the device will be described having a plurality of rotating arms and a plurality of shoe assemblies, though embodiments of the present invention may have one or more (e.g., 1, 2, 3, 4, 5, etc.) rotating arms and corresponding shoe assemblies.

According to embodiments of the present disclosure, the plurality of rotating arms 1a, 1b, and 1c may be identical, each with two ends 10 and 11 (noted as 10a, 11a for rotating arm 1a; 10b, 11b for rotating arm 1b; and 10c, 11c for rotating arm 1c), and can have any regular-shaped cross-section when viewed perpendicularly to the longitudinal directions of such arms, wherein each of such rotating arms is connected from one of its ends 10 (i.e., 10a, 10b, 10c) to a cylindrical wall, tube, or ring, 12 forming a shape of radially outwardly extended members. The rotating arms 1a, 1b, and 1c may be angularly equidistant to each other.

In embodiments of the present invention, each of the shoe assemblies 2 (i.e., 2a, 2b, 2c) has an upper surface 20 (i.e., 20a, 20b, 20c), a lower surface 21 (i.e., 21a, 21b, 21c), and a clamp 22 (i.e., 22a, 22b, 22c). Each of the shoe assemblies 2 (i.e., 2a, 2b, 2c) is connected to one of the free ends 11 (i.e., 11a, 11b, 11c) of the rotating arms 1a, 1b, and 1c using any suitable connecting means, such as bolts and/or nuts, wherein such shoe assemblies 2 (i.e., 2a, 2b, 2c) each hold tire specimens 100 (i.e. 100a, 100b, 100c) at their lower surface 21 (i.e., 21a, 21b, 21c) respectively, wherein such holding may be achieved by clamps 22 (i.e., 22a, 22b, 22c). In the holding process of the tire specimens, each tire specimen as well as the upper and lower surfaces 20 and 21, respectively, of each shoe assembly 2 becomes bounded by each of the clamps 22. The tire specimens may be of any shape (e.g., rectangular shape). The clamps 22 for holding the tire specimens may be bolted bracket clamps.

In embodiments of the present invention, the rotating arms 1a, 1b, and 1c rotate about the central shaft 3, wherein such central shaft 3 is connected to the stabilizing weight 4. The stabilizing weight 4 may have a disc-shape with an upper surface 40 and a lower surface 41.

In embodiments of the present invention, the central shaft 3 is connected to said stabilizing weight 4 at the center of the stabilizing weight's upper surface 40 such that the central shaft 3 is substantially perpendicular to the upper surface 40 of the weight 4.

In embodiments of the present invention, the shaft 5 (which may be referred to as the second shaft in this description and/or the claims) has a first end 50 connected to a cylindrical wall 52, wherein the shaft 5 is thus maintained substantially perpendicular to the central shaft 3 via the cylindrical wall 52. The rotating arms 1a, 1b, and 1c rotate relative to the shaft 5 and the stabilizing weight 4.

In embodiments of the present invention, the stabilizing weight 4 prevents any undesired potential vibrations during operation of the device.

In embodiments of the present invention, the spring 6 is connected to the shaft 5 from one end of such spring, and to the end 11a of the rotating arm 1a from the other end of such spring 6, wherein such spring 6 deflects in proportion to the angular displacement of the rotating arms 1a, 1b, and 1c from their default position when the device is operated.

In embodiments of the present invention, the handle 7 is connected to the end 51 of the shaft 5 by any suitable connecting means, such as a welding joint, wherein such handle 7 enables the carrying of the device easily and safely. The handle 7 also permits a user to maintain the shaft 5 stationary relative to the angular motion of the rotating arms during operation of the device.

In embodiments of the present invention, the angular scale 8 connects to a rotating arm, and may be connected between two adjacent rotating arms (e.g., 1a and 1c), wherein such arms 1a and 1c are the closest arms to the longitudinal direction of the shaft 5. The angular scale 8 may be calibrated to any suitable measuring range in order to measure various parameters, including the effect of tire material on skid resistance, the effect of pavement material, the effect of pavement surface roughness, and the effect of pavement surface conditions, as well as the coefficient of friction. As an example, for comparative measurements, the spring 6 extension can represent the skid resistance, wherein each unit length of the spring extension represents a certain skid resistance in newtons, depending on the spring force-deflection characteristics. Whereas, for coefficient of friction measurements (which are dimensionless), the spring extension reading can be converted to force (in newtons) before dividing this force by the weight of the device resting on the shoe assemblies 2 (in newtons).

In embodiments of the present invention, there is an alternative method of measuring the coefficient of friction, wherein such method comprises dividing a tangential force by a normal force. The tangential force can be measured by the deflection of the spring 6, since the deflection of the spring 6 is a function of the tangential force, while the normal force is the weight of the device resting on the shoe assemblies 2. For example, when resting the three arms 1a, 1b, 1c on a certain spot of a pavement and rotated using the manual arm 7, the force transmitted through the spring will be high if the skid resistance is high, leading to a higher extension of the spring, and as a result, a higher reading on the angular scale, i.e., a higher tangential force. Dividing this reading by the weight of device resting on the shoe assemblies (the normal force) will give the coefficient of friction.

In embodiments of the present invention, the stiffness of the spring 6, the material of the spring 6, as well as the number and diameter of coils in the spring 6 may be chosen such that all the readings fall within the expanded length of the spring 6. This means that the spring stiffness can be selected according to the expected value of the skid resistance. Thus, a higher skid resistance would need a higher spring stiffness.

Embodiments of the present invention can be configured to slide on the central shaft 3, wherein such sliding enables the usage of such device on different terrain features while keeping the tire specimens in contact with the ground (e.g., the selected test pavement or road surface). To explain further, according to the theory of location, a body resting on three points ensures that all the three points will keep contact with surface, regardless of the flatness of that surface.

The stabilizing weight 4, rotating arms 1, shoe assemblies 2, central shaft 3, shaft 5, handle 7, and angular scale 8 may each be made from any suitable rigid material (e.g., aluminum due to its light weight and rigidity).

In embodiments of the present invention, the rotation of the rotating arms 1a, 1b, and 1c can be enhanced by adding one or more ball bearings (not shown) on the central shaft 3, and inserting such bearings in the cylindrical wall 12.

In embodiments of the present invention, the device can be operated by applying a tangential force (e.g., by a user)

to one of the plurality of rotating arms 1a, 1b, and/or 1c that will cause the spring 6 to expand in order to rotate such arms, after ensuring that the tire specimens to be tested are installed on the shoe assemblies 2 and are in contact with the ground surface (e.g., a pavement surface).

The device according to embodiments of the present invention compares the tire to pavement skid resistance under different conditions, wherein such different conditions include having different tire specimens 100a, 100b, 100c (i.e., mounted to each of the shoe assemblies 2a, 2b, and 2c) and one ground, or pavement, type, or having the same tire specimens and different ground, or pavement, types, such as ground types made of asphalt or cement.

According to certain embodiments of the present disclosure, the device is portable and can be transported in the car boot. The device can be used on any spot of any pavement.

According to certain embodiments of the present disclosure, the device may be manually operated and can be placed on the desired spot of a pavement with the lower surface 41 of the stabilizing weight 4 resting on the surface of the pavement so that one or more shoe assemblies 2 (e.g., 2a, 2b, 2c) slide down along the shaft 3 to rest on the pavement. One or more tire specimens 100 (e.g., 100a, 100b, 100c) fitted to the shoe assemblies 2 (e.g., 2a, 2b, 2c) become in contact with the pavement. The handle 7 may be manually rotated counterclockwise. The manual force causes a rotating torque to be transmitted to the one or more arms 1 (e.g., 1a, 1b, 1c) through the spring 6 causing the arm(s) to rotate about the shaft 3. The friction between the tire specimen(s) 100 (e.g., 100a, 100b, 100c) will partially resist rotation of the arm(s) 1 (e.g., 1a, 1b, 1c) causing an extension of the spring 6. This extension is proportional to the frictional force between the tire material and pavement (skid resistance). Extension of the spring 6 changes the angular position of the handle 7 in relation to the arm 1 to which it is attached. This angular position may be measured on the angular scale 8. The higher the skid resistance, the higher is the angular displacement of the handle 7.

EXAMPLE

Embodiments of the present disclosure are further illustrated by the following examples, which are set forth to illustrate the presently disclosed subject matter and are not to be construed as limiting. The examples describe testing carried out to confirm the ability of embodiments of the present invention to operate under various conditions that exemplify various environments in which embodiments of the present invention may be utilized.

Figure 3A:
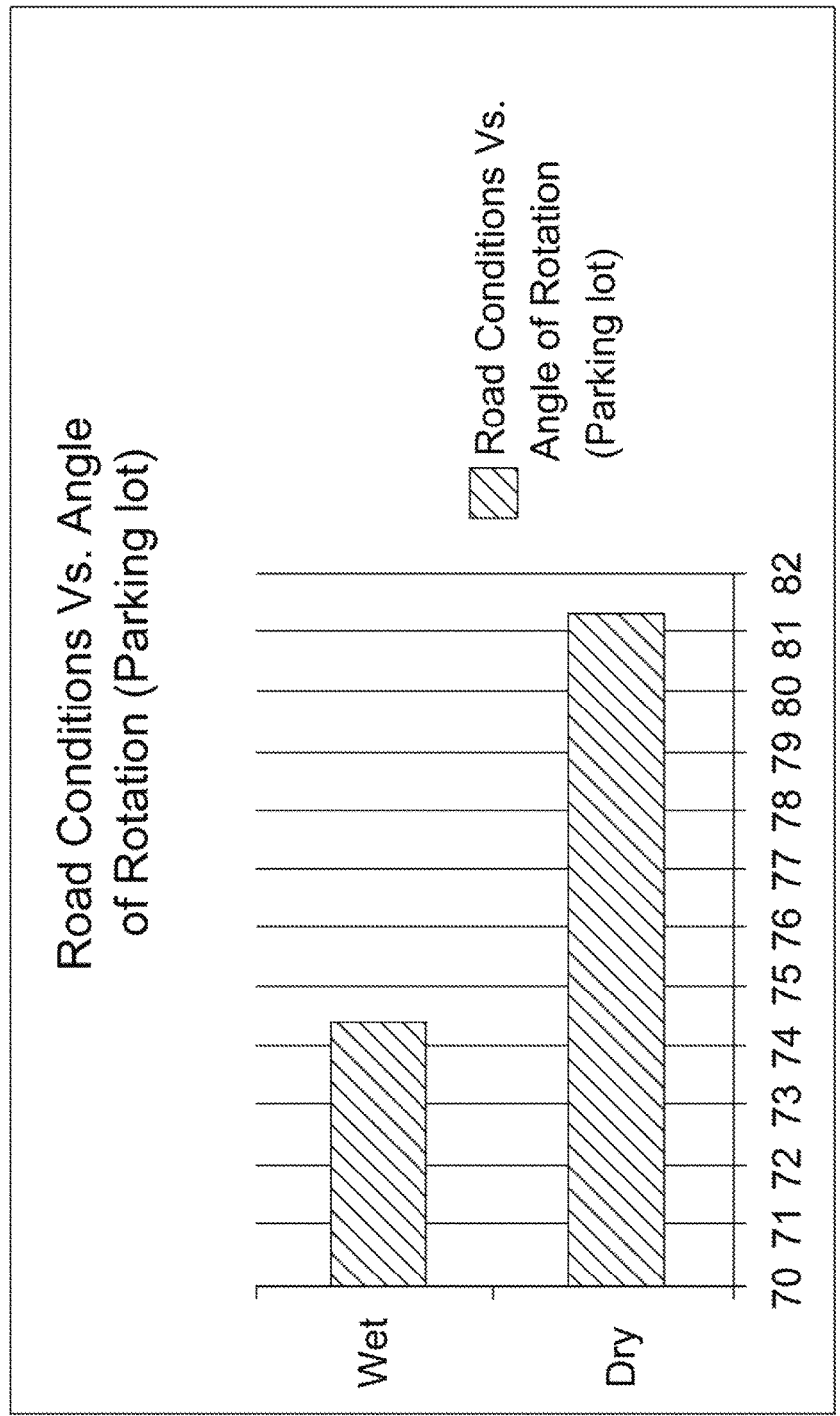
FIG. 3A illustrates a plot of different road conditions versus angle of rotation for a test conducted on a parking lot by a device for measuring and comparing tire to pavement skid resistance under different conditions, configured according to embodiments of the present invention.
Figure 3B:
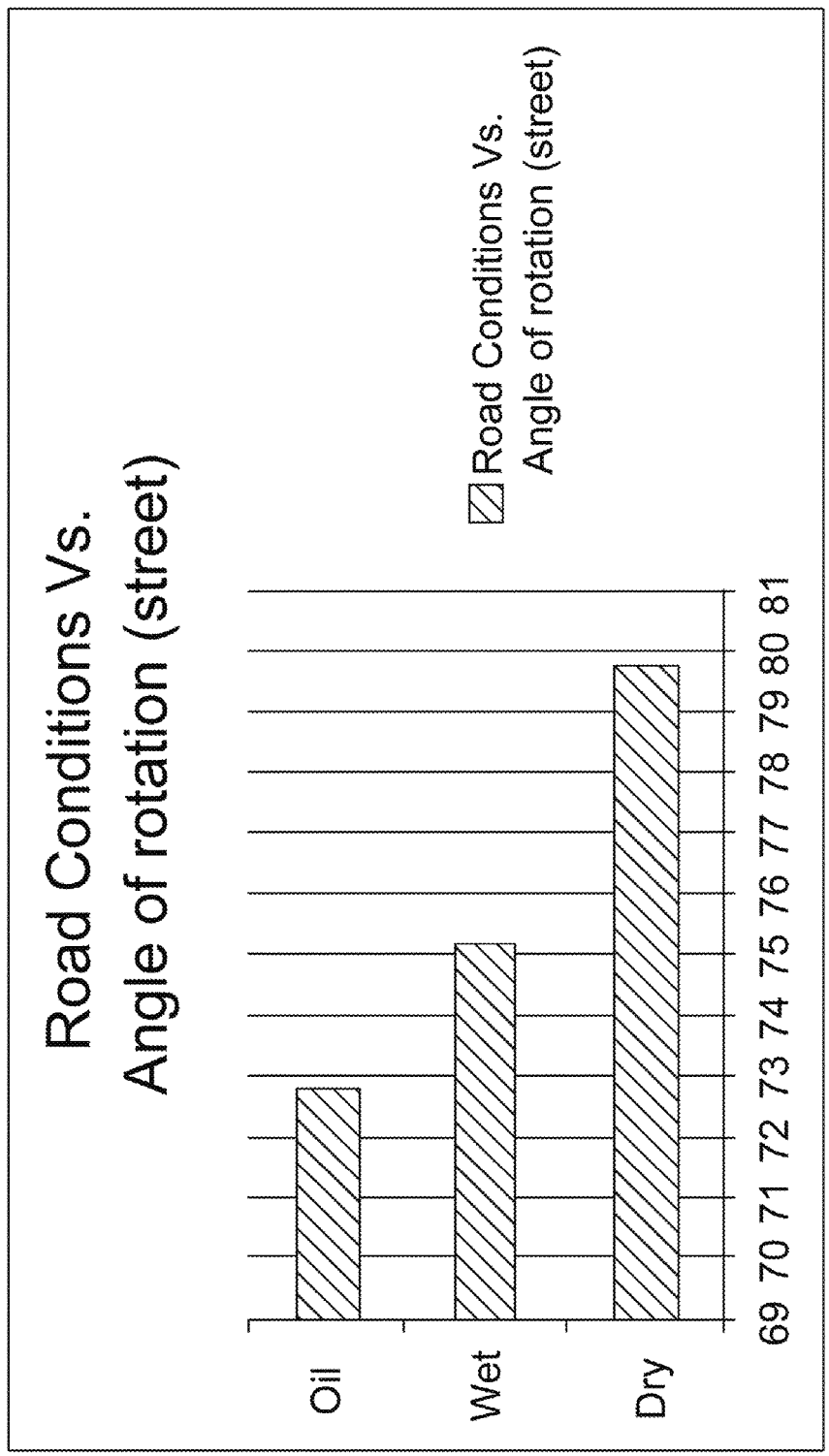
FIG. 3B illustrates a plot of different road conditions versus angle of rotation for a test conducted on a street by a device for measuring and comparing tire to pavement skid resistance under different conditions, configured according to embodiments of the present invention.

In tests conducted on a parking lot and on a typical road surface for a tire specimen using the device according to embodiments of the present invention, it was clearly indicated that the device provides good comparative results, as illustrated in FIGS. 3A and 3B. FIG. 3A illustrates a comparison of skid resistance on an asphalted public car park under dry and wet (water contaminated surface) conditions. The purpose of the test was to ensure that the device can compare skid resistance if the surface condition is changed from dry to wet. The readings on the horizontal axis of the plot represent the reading on the angular scale in degrees. Being comparative readings, these readings can then be converted to force units if desired. Likewise, FIG. 3B shows a comparison between three surface contamination conditions. The first two are those described in FIG. 3A (dry and water contaminated) with an additional case of SAE 40 engine oil contaminated surface. The three tests were carried under the same conditions of pavement type, location, same tire material, etc. The only variable was the surface condition.

The singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

As used herein, the terms "approximately" or "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. The term "comprising," which is synonymous with "including," "containing," or "characterized by," is inclusive or open-ended and does not exclude additional, unrecited elements or method steps. "Comprising" is a term of art used in claim language which means that the named elements are present, but other elements can be added and still form a construct or method within the scope of the claim.

While the invention has been described in detail and with reference to specific embodiments thereof, it will be apparent to one skilled in the art that various additions, omissions, and modifications can be made without departing from the spirit and scope thereof. Although the above description contains many specificities, these should not be construed as limitations on the scope of the invention but is merely representative of embodiments of this invention. Embodiments of the invention described above are intended to be exemplary only.

The invention claimed is:

1. A device for measuring and comparing tire to pavement skid resistance under a specified condition comprising a tire specimen and a ground type, wherein said device comprises:
   a first rotating arm with a first end and a second end;
   a ring, wherein said first rotating arm is connected from the first end to said ring forming a radially outwardly extending arm;
   a first shoe assembly having an upper surface and a lower surface, wherein said first shoe assembly is connected to the second end of said first rotating arm, wherein said tire specimen is installed on said lower surface of said first shoe assembly;
   a stabilizing weight with an upper surface and a lower surface;
   a central shaft, wherein said central shaft is connected to said upper surface of said stabilizing weight, wherein said central shaft is positioned collinearly within an inside of said ring;
   a second shaft with a first end and a second end, wherein said second shaft is coupled to said central shaft; and
   a spring, wherein a first end of said spring is connected to the first end of said second shaft, and wherein a second end of said spring is connected to said first rotating arm.

2. The device of claim 1, further comprising a handle connected to said second shaft.

3. The device of claim 2, wherein said handle is connected to the first end of said second shaft.

4. The device of claim 1, wherein there are a plurality of said rotating arms angularly equidistant from each other.

5. The device of claim 4, further comprising an angular scale connected to two adjacent rotating arms of said plurality of rotating arms.

6. The device of claim 5, wherein said angular scale is configured to be calibrated to measure different parameters including an effect of tire material on skid resistance, an effect of pavement material, an effect of pavement surface roughness, an effect of pavement surface conditions, or a coefficient of friction.

7. The device of claim 1, wherein said first tire specimen is installed on said lower surface of said first shoe assembly by a clamp.

8. The device of claim 1, wherein said first rotating arm rotates about said central shaft.

9. The device of claim 1, wherein a stiffness, number of coils, diameter of coils, and a material of said spring are chosen so that measurement readings lie within a deflection of such spring.

10. The device of claim 1, wherein said device is configured to slide on said central shaft.

11. The device of claim 1, further comprising a second rotating arm with a first end and a second end, wherein said second rotating arm is connected from its first end to said ring forming a second radially outwardly extending arm with an angular distance from said first rotating arm.

12. The device of claim 11, further comprising a second shoe assembly having an upper surface and a lower surface, wherein said second shoe assembly is connected to the second end of the second rotating arm, wherein a second tire specimen is installed on said lower surface of said second shoe assembly.

13. The device of claim 12, wherein a longitudinal direction of said second shaft is perpendicular to said central shaft.

14. The device of claim 12, further comprising:
   a third rotating arm with a first end and a second end, wherein said third rotating arm is connected from its first end to said ring forming a third radially outwardly extending arm; and
   a third shoe assembly having an upper surface and a lower surface, wherein said third shoe assembly is connected to the second end of said third rotating arm, wherein a third tire specimen is installed on said lower surface of third said shoe assembly.

15. The device of claim 14, wherein the first, second, and third rotating arms are positioned angularly equidistant from each other.

16. The device of claim 11, further comprising an angular scale connected to the first and second rotating arms, wherein said angular scale is configured to be calibrated to measure different parameters including an effect of tire material on skid resistance, an effect of pavement material, an effect of pavement surface roughness, an effect of pavement surface conditions, or a coefficient of friction.

17. The device of claim 1, wherein a longitudinal direction of said second shaft is perpendicular to said central shaft.

18. The device of claim 1, wherein said first shoe assembly is affixed to said first rotating arm in a static relationship.

19. The device of claim 14, wherein said second shoe assembly is affixed to said second rotating arm in a static relationship.

20. The device of claim 14, wherein said third shoe assembly is affixed to said third rotating arm in a static relationship.

* * * * *